United States Patent
Sakai et al.

(10) Patent No.: US 9,003,147 B2
(45) Date of Patent: Apr. 7, 2015

(54) ELECTRONIC DEVICE AND SAVE DATA RECORDING METHOD

(75) Inventors: Masaharu Sakai, Tokyo (JP); Yoichiro Iino, Tokyo (JP); Shinichi Tanaka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 171 days.

(21) Appl. No.: 13/605,047

(22) Filed: Sep. 6, 2012

(65) Prior Publication Data

US 2013/0159654 A1 Jun. 20, 2013

(30) Foreign Application Priority Data

Dec. 14, 2011 (JP) .................................. 2011-273879

(51) Int. Cl.
*G06F 12/14* (2006.01)
*G06F 3/06* (2006.01)
*A63F 13/40* (2014.01)

(52) U.S. Cl.
CPC .............. *G06F 3/0605* (2013.01); *A63F 13/10* (2013.01); *A63F 2300/209* (2013.01); *G06F 3/0608* (2013.01); *G06F 3/0665* (2013.01); *G06F 3/0679* (2013.01)

(58) Field of Classification Search
CPC ................................ G06F 12/14; G06F 3/0605
USPC .......... 711/163, 115, E12.091; 463/1, 24, 37, 463/43, 44; 713/167, 171, 193; 365/185.17; 714/11, 721
See application file for complete search history.

(56) References Cited

U.S. PATENT DOCUMENTS

| | | | |
|---|---|---|---|
| 6,716,102 B2 | 4/2004 | Whitten | |
| 6,769,988 B1* | 8/2004 | Sato et al. | 463/38 |
| 6,918,828 B2* | 7/2005 | Horikawa | 463/1 |
| 7,444,364 B2 | 10/2008 | Fukao | |
| 7,682,252 B2* | 3/2010 | Mitsuhara et al. | 463/43 |
| 2002/0142845 A1 | 10/2002 | Randall Whitten | |
| 2003/0073497 A1* | 4/2003 | Nelson | 463/42 |
| 2005/0164795 A1* | 7/2005 | Whitten et al. | 463/44 |

(Continued)

FOREIGN PATENT DOCUMENTS

| | | |
|---|---|---|
| JP | 2001232069 A | 8/2001 |
| JP | 2002278728 A | 9/2002 |

(Continued)

OTHER PUBLICATIONS

Nintendo, "Nintendo 3 DS Operations Manual", dated Nov. 28, 2011, pp. 1-101.*
Office Action issued for corresponding Japanese Patent Application No. 2011-273879, dated Jul. 23, 2013.
White Witch—Another Legend of Heroes, user manual, Hudson Soft Company, Limited, 4 pages, Aug. 2, 2004 (for relevancy, see JP Office Action, dated Jul. 23, 2013, p. 1, paragraph 3 and p. 2).

(Continued)

*Primary Examiner* — Mardochee Chery
*Assistant Examiner* — Kamal K Dewan
(74) *Attorney, Agent, or Firm* — Matthew B. Dernier, Esq.; Gibson & Dernier LLP

(57) ABSTRACT

A virtual capacity acquisition unit acquires a size of virtual capacity of a save data area from an application. A storage capacity acquisition unit acquires a size of save data of the application. A writing control unit prohibits the application from writing the save data exceeding the virtual capacity in a recording device. A free space acquisition unit acquires a size of free space of the recoding device, and the writing control unit prohibits the writing of save data whose size is larger than that of the free space.

7 Claims, 5 Drawing Sheets

(56) References Cited

U.S. PATENT DOCUMENTS

| | | |
|---|---|---|
| 2006/0181735 A1 | 8/2006 | Fukao |
| 2007/0004506 A1* | 1/2007 | Kinsley et al. ............... 463/29 |
| 2008/0182668 A1* | 7/2008 | Tominaga et al. ............ 463/43 |
| 2008/0261702 A1* | 10/2008 | Rubin ............................ 463/43 |
| 2009/0258712 A1* | 10/2009 | Tanaka .......................... 463/43 |
| 2010/0137046 A1* | 6/2010 | Kataoka et al. ................ 463/1 |
| 2011/0092280 A1* | 4/2011 | Koyama et al. ............... 463/29 |
| 2011/0264714 A1* | 10/2011 | Fourcade et al. ............ 707/824 |

FOREIGN PATENT DOCUMENTS

| | | |
|---|---|---|
| JP | 2002358221 A | 12/2002 |
| JP | 2006252507 A | 9/2006 |
| JP | 2008073259 A | 4/2008 |

OTHER PUBLICATIONS

RPG Tsukuru DS, official guidebook, Enterbrain, Inc., first edition, vol. 11, 7 pages, Mar. 23, 2010 (for relevancy, see JP Office Action, dated Jul. 23, 2013, p. 2, paragraph 4 and p. 3).

RPG Tsukuru DS, Weekly Famitsu, Enterbrain, Inc., "Tow Sizes: Full and DP", vol. 25, No. 2, 7 pages, Jan. 14, 2010 (for relevancy, see JP Office Action, dated Jul. 23, 2013, p. 3, paragraphs 2 and 3).

RPG Tsukuru DS, Weekly Famitsu, Enterbrain, Inc., "Provided with function for allowing players without software to play" vol. 24, No. 50, 7 pages, Dec. 3, 2009 (for relevancy, see JP Office Action, dated Jul. 23, 2013, p. 3, paragraphs 2 and 3).

Office Action for corresponding JP Application No. 2011273879, dated Jun. 3, 2014.

Office Action for corresponding JP Application No. 2011273879, dated Sep. 30, 2014.

* cited by examiner

ELECTRONIC DEVICE AND SAVE DATA RECORDING METHOD

BACKGROUND OF THE INVENTION

1. Field of the Invention

The present invention relates to a technology for managing a recording area used by an application.

2. Description of the Related Art

By storing (saving) the progress status of game play in a recording device, a user can later play a game starting from where the user left off last time using game data stored in the recording device. Conventionally, game devices have been suggested, for the purpose of preventing easy duplication of save data, that add status information indicating the status of an execution environment of a game program to game data at the time of saving the game data and that determine whether the current status information matches the status information added to the save data at the time of loading the save data.

[Patent document No. 1] US Patent Publication No. 2009/0258712

Game programs are distributed and sold in the form of a recording medium. Conventionally, since a game program is recorded in a ROM medium, save data cannot be written in a recording medium. However, a writable recording area, when provided in a recording medium in which a game program is recorded, allows save data to be written. With the development of the Internet in recent years, an environment has been arranged where game programs are distributed to user terminal via the Internet from game servers. Game makers can then sell game programs that were sold in the form of a recording medium in the beginning by distributing the game programs form the game servers.

A game program downloaded onto a user terminal is installed in a large-capacity recording device. Thus, capacity that can be used for a game to record save data necessarily increases. However, if save data is attempted to be recorded substantially without any limitation in a large-capacity recording device for a game installed originally in a recording medium, it is not sure whether the game will operate in a normal way. Therefore, it is necessary for the game maker to remaster download-type game programs, in this case. This remastering imposes a burden on the game maker. Therefore, regardless of whether the game programs are of recording-medium type or download type, it is desirable to be able to sell the same game programs without performing remastering.

SUMMARY OF THE INVENTION

In this background, a purpose of the present invention is to provide a technology for managing a recording area used by an application.

An electronic device according to one embodiment of the present invention comprises: an execution unit configured to execute an application; a first acquisition unit configured to acquire a size of virtual capacity of a save data area from the application; a second acquisition unit configured to acquire a size of save data of the application recorded in a recording device; and a writing control unit configured to prohibit the application from writing the save data exceeding the virtual capacity in the recording device.

Another embodiment of the present invention relates to a save data recording method. This method comprises: acquiring a size of virtual capacity of a save data area from an application; acquiring a size of save data of the application recorded in a recording device; and prohibiting the application from writing the save data exceeding the virtual capacity in the recording device.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

An explanation is given regarding the exterior configuration and circuit configuration of an electronic device according to the present exemplary embodiment. The electronic device shown in the following is a portable game device. However, the electronic device may be a portable terminal device of other types. An electronic device 10 may be a console-type terminal device as well as a portable terminal device.

[Configuration of Front Surface Portion]

Figure 1A:
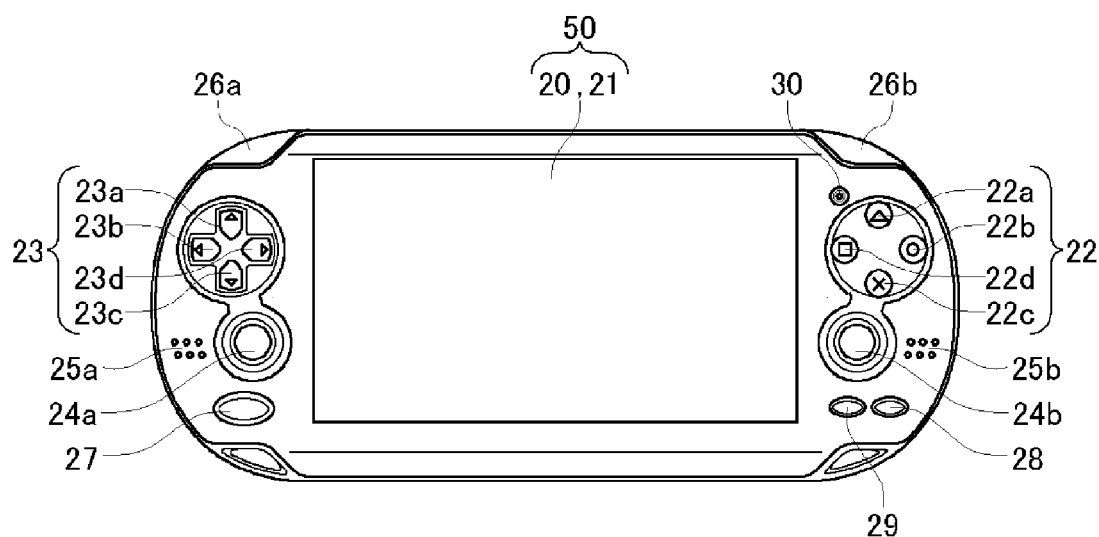
FIG. 1A is a diagram illustrating the front surface of an electronic device.

FIG. 1A illustrates the front surface of the electronic device 10. The electronic device 10 is formed of a horizontally-long housing, and the left and right areas to be held by the user each have an arc-shaped outline contour. A rectangular touch panel 50 is provided on the front surface of the electronic device 10. The touch panel 50 comprises a display device 20 and a transparent front touch pad 21 that covers the surface of the display device 20. The display device 20 is an organic EL (Electro-Liminescence) panel and displays an image. The display device 20 may be a display means such as a liquid crystal panel or the like. The front touch pad 21 is a multi-touch pad having a function of detecting a plurality of points that are touched concurrently, and the touch panel 50 is formed as a multi-touch screen.

A triangle button 22a, a circle button 22b, a cross button 22c, and a square button 22d each located at a vertex of a rhomboid (hereinafter, generically referred to as "operation buttons 22") are provided on the right side of the touch panel 50. An up key 23a, a left key 23b, a down key 23c, and a right key 23d (hereinafter, generically referred to as "directional keys 23") are provided on the left side of the touch panel 50. The user can input eight directions, up, down, left, and right directions and oblique directions, by operating the directional keys 23. A left stick 24a is provided below the directional keys 23, and a right stick 24b is provided below the operation buttons 22. The user tilts the left stick 24a or the right stick 24b (hereinafter, generically referred to as "analog sticks 24") so as to input a direction and the amount of a tilt. An L button 26a and an R button 26b are provided at the left and right top of the housing, respectively. The operation buttons 22, the directional keys 23, the analog sticks 24, the L button 26a, and the R button 26b form operation means operated by the user.

A front camera 30 is provided near the operation buttons 22. A left speaker 25a and a right speaker 25b that output sounds (hereinafter, generically referred to as "speakers 25") are provided on the left side of the left stick 24a and on the right side of the right stick 24b, respectively. A HOME button 27 is provided below the left stick 24a, and a START button 28 and a SELECT button 29 are provided below the right stick 24b.

[Configuration of Rear Surface Portion]

Figure 1B:
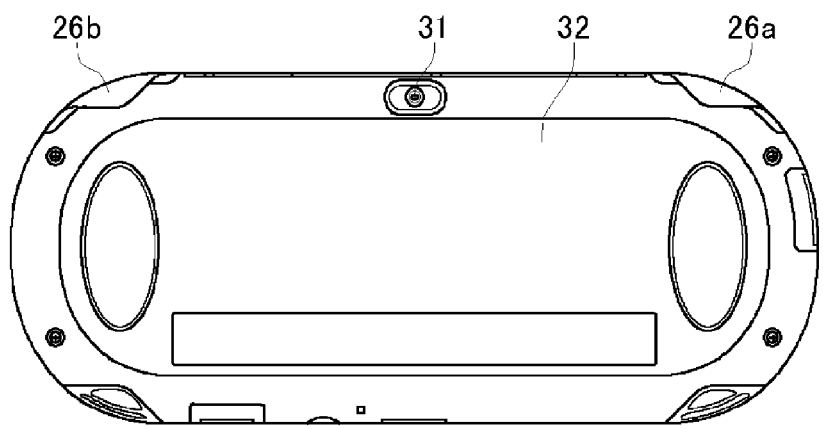
FIG. 1B is a diagram illustrating the rear surface of the electronic device.

FIG. 1B illustrates the rear surface of the electronic device 10. A rear camera 31 and a rear touch pad 32 are provided on the rear surface of the electronic device 10. The rear touch pad 32, as in the case of the front touch pad 21, is formed as a multi-touch pad. The electronic device 10 is provided with the two cameras and touch pads on the front and rear surfaces.

[Configuration of Top Surface Portion]

Figure 2A:
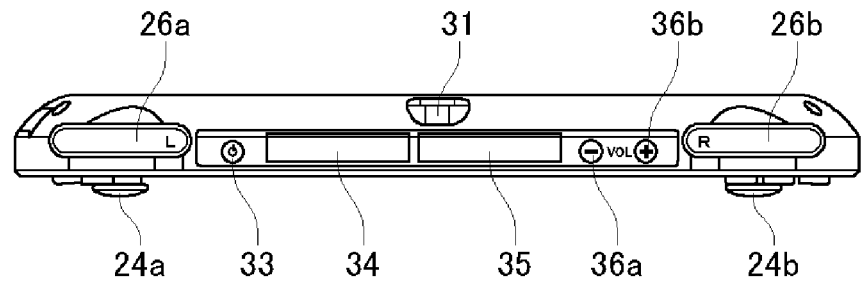
FIG. 2A is a diagram illustrating the top surface of the electronic device.

FIG. 2A illustrates the top surface of the electronic device 10. As described previously, the L button 26a and the R button 26b are provided at the left and right edges of the top surface of the electronic device 10, respectively. A power button 33 is provided on the right side of the L button 26a, and the user turns the power on or off by pressing the power button 33 for at least a predetermined period of time (e.g., two seconds). The electronic device 10 has a power control function of transitioning to a suspend state when a time period during which the operation means is not operated (no operation time period) lasts for a predetermined period of time. When the electronic device 10 enters the suspend state, the user can bring the electronic device 10 back to an awake state from the suspend state by pressing the power button 33 for a short period of time (e.g., two seconds or less).

A game card slot 34 is a slot for inserting a game card. In the figure, the game card slot 34 covered by a slot cover is shown. An LED lamp that flashes when the game card is being accessed may be provided near the game card slot 34. An accessory terminal 35 is for connecting peripheral devices (accessories). In the figure, the accessory terminal 35 is shown being covered by a terminal cover. A negative button 36a and a positive button 36b for adjusting the volume are provided between the accessory terminal 35 and the R button 26b.

[Configuration of Bottom Surface Portion]

Figure 2B:
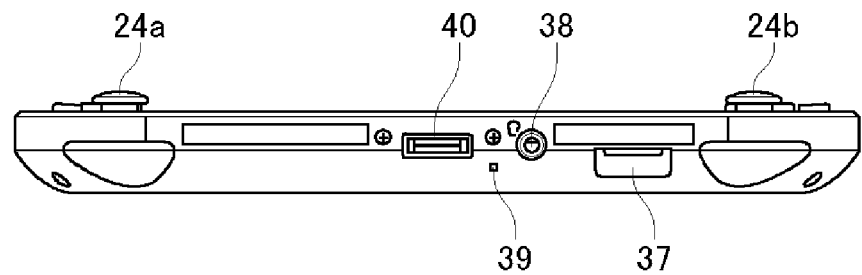
FIG. 2B is a diagram illustrating the bottom surface of the electronic device.

FIG. 2B illustrates the bottom surface of the electronic device 10. A memory card slot 37 is a slot for inserting a memory card. In the figure, the memory card slot 37 covered by a slot cover is shown. A sound input and output terminal 38, a microphone 39, and a multi-use terminal 40 are provided on the bottom surface of the electronic device 10. The multi-use terminal 40 is compatible with a USB (Universal Serial Bus) and can be connected to other devices via a USB cable.

[Configuration of Left Side Surface Portion]

Figure 2C:
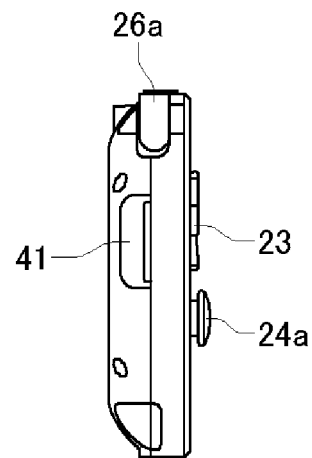
FIG. 2C is a diagram illustrating the left side surface of the electronic device.

FIG. 2C illustrates the left side surface of the electronic device 10. A SIM card slot 41 serving as a slot for inserting a SIM card is provided on the left side surface of the electronic device 10.

[Circuit Configuration of Electronic Device]

Figure 3:
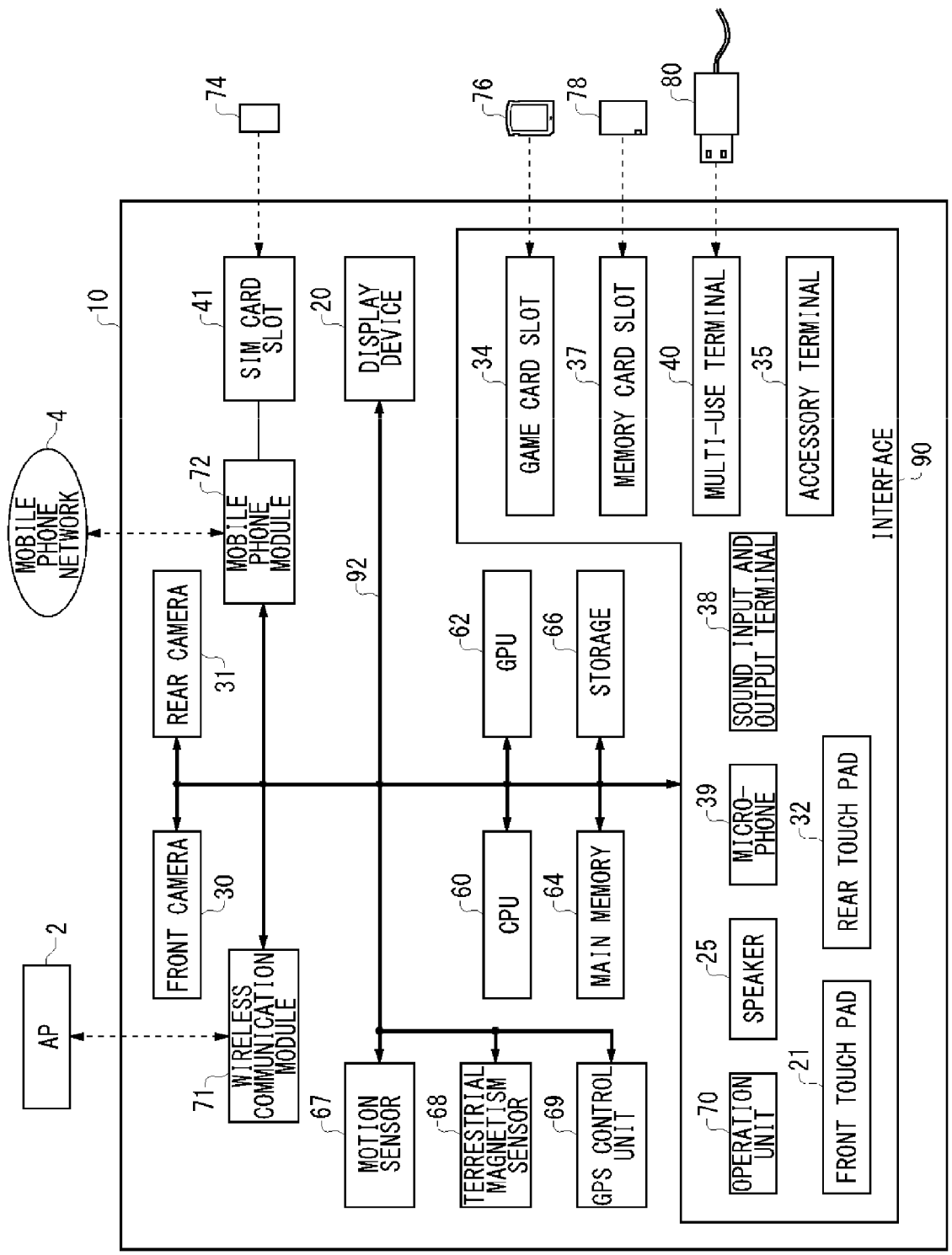
FIG. 3 is a diagram illustrating the circuit configuration of the electronic device.

FIG. 3 illustrates the circuit configuration of the electronic device 10. Components thereof are connected to one another via a bus 92. A wireless communication module 71 is formed with a wireless LAN module that complies with the communication standard of IEEE 802.11 b/g or the like and is connected to an external network via an AP 2. The wireless communication module 71 may have a communication function in Bluetooth (registered trademark) protocol. A mobile phone module 72 is compatible with a 3rd generation digital mobile phone method that complies with the IMT-2000 (International Mobile Telecommunication 2000) standard set by ITU (International Telecommunications Union) and is connected to a mobile phone network 4. A SIM card 74 in which a unique ID number for identifying the phone number of a mobile phone is recorded is inserted into the SIM card slot 41. The SIM card 74 being inserted into the SIM card slot 41 allows the mobile phone module 72 to communicate with the mobile phone network 4.

A CPU (Central Processing Unit) 60 executes a program or the like loaded in a main memory 64. A GPU (Graphics Processing Unit) 62 performs calculation necessary for image processing. The main memory 64 is configured with RAM (Random Access Memory) or the like and stores a program or data used by the CPU 60. A storage 66 is configured with a NAND-type flash memory or the like and used as a built-in auxiliary storage device.

A motion sensor 67 detects the behavior of the electronic device 10, and a terrestrial magnetism sensor 68 detects terrestrial magnetism in a triaxial direction. A GPS control unit 69 receives a signal from a GPS satellite and calculates a current position. The front camera 30 and the rear camera 31 each capture an image and input image data. The front camera 30 and the rear camera 31 are configured with a CMOS image sensor (Complementary Metal Oxide Semiconductor Image Sensor).

The display device 20 is an organic EL display device and has a light emitting device that emits light by applying voltage to the cathode and anode thereof. During a power saving mode, a voltage that is smaller than usual is applied between the electrodes such that the display device 20 is in a dimmed-light state. Thus, power consumption can be cut. The display device 20 may be a liquid crystal panel display device provided with a backlight. During the power saving mode, the amount of light of the backlight is reduced such that the liquid crystal panel display device is in a dimmed-light state. Thus, power consumption can be cut.

In an interface 90, an operation unit 70 includes various operation means provided in the electronic device 10. More specifically, the operation unit 70 includes the operation buttons 22, the directional keys 23, the analog sticks 24, the L button 26a, the R button 26b, the HOME button 27, the START button 28, the SELECT button 29, the power button 33, the negative button 36a, and the positive button 36b. The front touch pad 21 and the rear touch pad 32 are multi-touch pads, and the front touch pad 21 is arranged being overlaid on the surface of the display device 20. The speakers 25 output a sound created by the functions of the electronic device 10, and the microphone 39 inputs a sound from around the electronic device 10. The sound input and output terminal 38 inputs a stereo sound from the external microphone and outputs the stereo sound to an external headphone or the like.

A game card 76 in which a game file is recorded is inserted into the game card slot 34. The game card 76 has a data-writable recording area. When the game card 76 is placed in the game card slot 34, data is written or read by a media drive. A memory card 78 is inserted into the memory card slot 37. The memory card 78, when placed in the memory card slot 37, is used as an external auxiliary storage device. The multi-use terminal 40 can be used as a USB terminal and exchanges data with another USB device when the USB cable 80 is connected to the multi-use terminal 40. To the accessory terminal 35, a peripheral device is connected.

The electronic device 10 according to the present exemplary embodiment executes an application and records save data generated by the application in a recording device. An explanation is given regarding a case where the electronic device 10 is a game device for executing a game in the following. The electronic device 10 may execute applications other than a game. In the present exemplary embodiment, the save data is data stored by an application and includes data that indicates the progress of game play, high-score information, character data edited by the user, and the like if the electronic device 10 is a game device.

The electronic device 10 according to the present exemplary embodiment is capable of executing game programs recorded in two types of recording devices. A first game program is recorded in the game card 76. When the game card 76 is placed in the game card slot 34, the electronic device 10 reads the game program into the main memory 64 and executes the game program. A second game program is recorded in the memory card 78. This game program is downloaded onto the memory card 78 by the wireless communication module 71 or the mobile phone module 72 from a game server connected on the Internet and then installed. The electronic device 10 reads the game program from the memory card 78 into the main memory 64 and executes the game program. In the present exemplary embodiment, the first game program and the second game program may be a common program. The respective recording devices in which the first game program and the second game program are installed are different.

The first game program is distributed and sold in the form of a game card 76. The game card 76 may be of a cartridge type. In most cases, a single game program is installed therein. The first game program generates save data during the execution thereof and stores the save data in a writable recording area provided in the game card 76. There are various types of game cards 76 such as those with a recording area having a capacity of 100 MB (megabytes), 200 MB, 400 MB, or the like. For example, if the user is allowed to generate save data of up to 150 MB in total for a game, a game card of 200 MB or larger is used. The game maker creates a virtual environment that is the same as the game card to conduct a confirmation test to see whether the game program operates properly. After the game program is confirmed to operate properly, the game program is installed in a game card and sold.

A game title is sometimes sold as a second game program through a game server by the game maker or publisher after the same game title is sold in the form of a game card 76. As previously described, the second game program is downloaded onto the memory card 78 from the game server. The memory card 78 has a storage capacity of, e.g., tens of GB (gigabytes). Other game programs, files such as pictures and moving images taken by the user, and the like are sometimes recorded therein. In general, the memory card 78 often has large free space (available memory). Therefore, the size of free space of the memory card 78 is normally larger than that of the free space in the recording area prepared for the game card 76 in respect of a game program.

If the second game program is allowed to store save data according to the size of the free space of the memory card 78, the second game program operates in a state different from the state in which operation check is performed for the first game program. For example, if the second game program is allowed to store save data substantially without any limitation as long as there is enough free space in the memory card 78 when the first game program is allowed to store only up to 100 save data items in the game card 76, the operation check needs to be performed again since no such operation check has been performed at the time of selling the first game program.

In other words, if a game program that has been installed in the game card 76 is directly installed in the memory card 78 through the game server, and if the game program attempts to save huge amount of save data in the memory card 78, the operation of the game program cannot be guaranteed. Therefore, the game maker needs to perform remastering. This work is a burden. Thus, a mechanism is preferably provided that allows the same game program to properly operate without being affected by the volume of free space of a destination for storing save data, regardless of whether the game program is installed in the game card 76 or installed in the memory card 78.

Meanwhile, since the recording area of the memory card 78 is used by various applications, there might be a situation where the volume of the free space of the memory card 78 becomes extremely small. Thus, if the volume of the free space of the destination for storing the save data is insufficient, it is also necessary to provide a mechanism for prohibiting or adjusting the recording of the save data performed by the game program. An explanation is given in the following regarding a technique for managing save data in the present exemplary embodiment.

Figure 4:
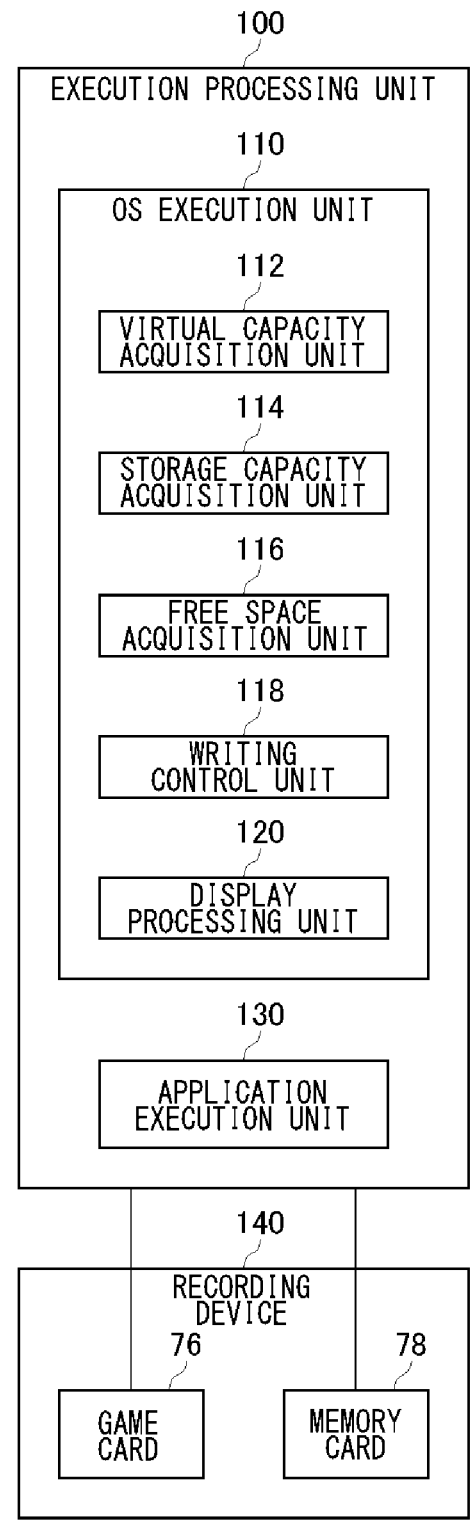
FIG. 4 is a diagram illustrating the configuration of an execution processing unit that performs writing processing of save data.

FIG. 4 is a diagram illustrating the configuration of an execution processing unit 100 that performs writing processing of save data. In FIG. 4, the elements shown in functional blocks that indicate a variety of processes are implemented in hardware by any CPU (Central Processing Unit), memory, or other LSI's, and in software by a program loaded in memory, etc. Therefore, it will be obvious to those skilled in the art that the functional blocks may be implemented in a variety of manners by hardware only, or by software only, or by a combination of hardware and software.

The execution processing unit 100 is provided with an OS execution unit 110 and an application execution unit 130. The OS execution unit 110 provides a function and an environment for efficiently using the electronic device 10 and executes an operating system (hereinafter, simply referred to as "OS (Operating System)") that controls the entire device in an integrated manner. The OS provides an API processing module that realizes a function of an API (Application Programming Interface) to be provided to a game program.

In the exemplary embodiment, the API processing module is configured by preparing a program for writing save data in a recording device 140 as a library (hereinafter, referred to as "save data utility") and by calling a save-data utility function by the game program. When the game program calls an API processing module for saving, the API processing module stores the save data in the recording device 140. The recording device 140 is the game card 76 or the memory card 78. Information indicating whether to store the save data in the game card 76 or in the memory card 78 is written in an accompanying configuration file of the game program, and the API processing module determines a destination for writing the save data in reference to the information. Normally, save data is written in the game card 76 if a game program installed in the game card 76 is executed, and save data is written in the memory card 78 if a game program installed in the memory card 78 is executed.

An explanation is given in the following regarding the outline of a plurality of types of save processing and load processing in the electronic device 10. The API processing module is configured in the OS by preparing a save-data utility function for each save processing and load processing shown in the following and by calling a save-data utility function required by a game program.

(1) List Selection Type Saving/Loading/Deleting

In list selection type processing, a list of a plurality of save data items specified by an application is displayed, and an item of save data selected by the user is saved/loaded/deleted after requesting the user an acknowledgement if necessary.

(2) Fixed Type Saving/Loading/Deleting

In fixed type processing, save data specified by the application is saved/loaded/deleted after requesting the user an acknowledgement if necessary.

(3) Auto Saving/Loading/Deleting

In auto type processing, save data specified by the application is saved/loaded/deleted without any notification or acknowledgement to the user.

The application execution unit 130 reads a game program from the game card 76 or the memory card 78 into the main memory 64 and starts a game. Shown below is processing performed when the application execution unit 130 executes a game program installed in the memory card 78. The same processing is also performed when the application execution unit 130 executes a game program installed in the game card 76.

The OS execution unit 110 has a virtual capacity acquisition unit 112, a storage capacity acquisition unit 114, a free space acquisition unit 116, a writing control unit 118, and a display processing unit 120 and manages writing of save data by an application. These features, alone or in combination, provide a plurality of API processing modules for an application. When the application calls a save-data utility function for the OS execution unit 110, the OS execution unit 110 starts a called API processing module. The API processing module may be started when the application is started. Alternatively, the API processing module may be started when the application makes a request for writing save data.

An application according to the present exemplary embodiment has a function of declaring for an API processing module an upper limit value of a save data area to be used (hereinafter, also referred to as "virtual capacity"). The virtual capacity of a save data area indicates the maximum data amount of save data stored by the application, and save data exceeding the declared virtual capacity cannot be recorded by the application. The API processing module has a function of prohibiting the recording of save data if the save data exceeding the virtual capacity declared by the application is attempted to be recorded. The API processing module has a function of prohibiting or adjusting the recording if the storage capacity of the recording device 140 serving as a destination for saving is smaller than the data amount of save data to be recorded.

In the OS execution unit 110, the virtual capacity acquisition unit 112 acquires the size of the virtual capacity of the save data area from the application. The size of virtual capacity is written in an application's configuration file or the like and is set for each application. Although the application declares the virtual capacity of the save data area, the application does not reserve a physical recording area in the recording device 140. Therefore, for example, even if a free space of the recording device 140 is 100 MB when the application declares a virtual capacity to be 200 MB, the application does not reserve a recording area of 200 MB. Thus, the application can be executed without problems.

The storage capacity acquisition unit 114 acquires the volume of save data stored in the past in the memory card 78 by the application. This allows the writing control unit 118 to obtain, by calculation, the data amount of save data that can be stored by the application. For example, when the declared virtual capacity is 200 MB while the amount of the save data recorded in the past is 150 MB, the writing control unit 118 recognizes that the application can record additional save data of 50 MB in the memory card 78. In this case, if the amount of data to be saved is 50 MB or less when the writing control unit 118 receives a request for writing the save data from the application, the writing control unit 118 writes the save data in a predetermined area of the memory card 78.

On the other hand, if the total record volume (data size) of the save data exceeds the size of the virtual capacity due to the writing of the save data when the writing control unit 118 receives the request for writing the save data from the application, writing control unit 118 prohibits the writing of the save data. For example, upon the receipt of a request for writing save data of more than 1 MB when the declared virtual capacity is 200 MB while the amount of the save data already recorded in the memory card 78 is 199 MB, the writing control unit 118 prohibits the writing of the save data into the memory card 78 and returns an error code to the application indicating that the save data cannot be saved due to an insufficiency of virtual capacity. This allows the writing control unit 118 to keep the record volume of the save data of the application to be within the range of the virtual capacity.

Furthermore, in the OS execution unit 110 according to the present exemplary embodiment, the free space acquisition unit 116 acquires the size of free space of the memory card 78. The writing control unit 118 prohibits the writing of save data whose data size is larger than the size of the free space of the memory card 78. For example, upon the receipt of a request for writing save data of more than 1 MB when the free space of the memory card 78 is only 1 MB, the writing control unit 118 prohibits the writing of the save data into the memory card 78 and returns an error code to the application indicating that the save data cannot be saved due to an insufficiency of free space.

The display processing unit 120 may display on the display device 20 a message indicating that the volume of the free space of the memory card 78 becomes insufficient if the writing control unit 118 receives a request for writing save data whose data size is larger than that of the free space of the memory card 78. The application execution unit 130 temporarily stops the game at this time, and the user deletes data that is unnecessary in the recording device 140. Then, when the application execution unit 130 resumes the game, the writing control unit 118 can write the save data in the memory card 78 since an insufficiency of free space in the memory card 78 has been resolved. As described, the display processing unit 120 displays an error message, and the deletion of data by the user, etc., are carried out in the system. Therefore, the application does not need to have a function related to an insufficiency of free space in the memory card 78.

The display processing unit 120 of the system may display an error message. Alternatively, the application may display an error message. In the case where there is an insufficiency of free space, the writing control unit 118 returns to the application both an error code indicating the insufficiency of free space and the amount of a shortage of space in the memory card 78. The application has a fixed phrase for notifying the user of an insufficiency of free space. The application puts the actual amount of the shortage of space into the fixed phrase and displays an error message. This fixed phrase includes an announcement containing a procedure for the user to delete data of the memory card 78. In accordance with the announcement, the user may suspend the application, go back to a home screen image of a system, and delete other content files, other applications, etc., so as to reserve the size of the free space of the memory card 78.

The application may guide the deletion of save data if the size of free space has become insufficient. As described later, save data is managed in units of slots, and the user deletes the save data by deleting slots so that the size of the free space of the memory card 78 can be reserved.

If it is not preferred to temporarily stop the game, the writing control unit 118 may overwrite save the save data in the memory card 78. In reference to the generation date and time of the save data, the writing control unit 118 overwrites save data having the oldest generation date and time at this time. In particular, it is not preferred to temporarily stop the game if the writing control unit 118 auto-saves the save data without user's instruction. Therefore, if there is an insufficiency of free space in the memory card 78, new save data can be recorded in the memory card 78 by overwriting old save data.

Described above is an explanation of a case when the application execution unit 130 executes an application installed in the memory card 78 and records the save data thereof in the memory card 78. In the case when the application execution unit 130 executes an application installed in the game card 76 and records the save data thereof in the game card 76, the OS execution unit 110 also operates in the same way.

Figure 5:
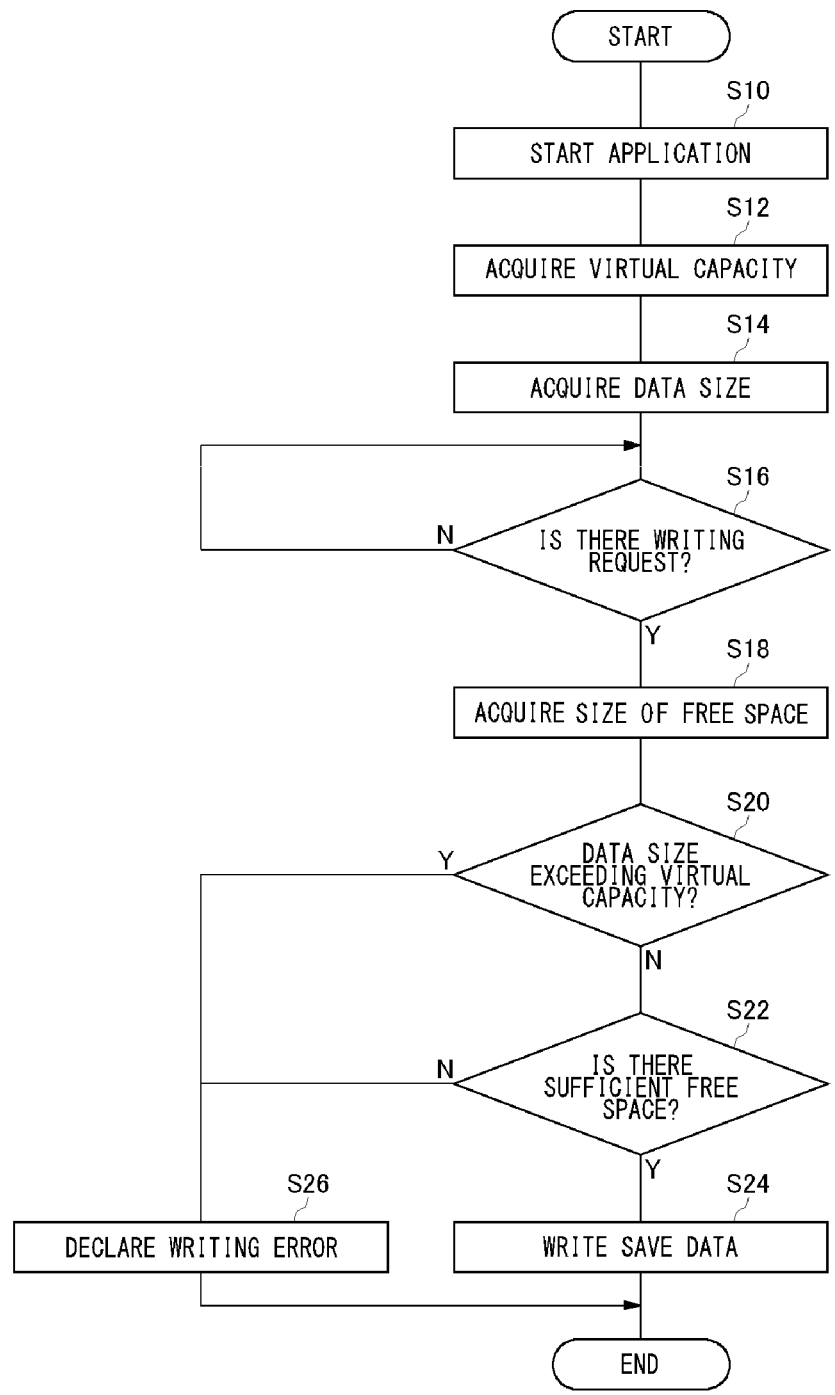
FIG. 5 is a flowchart illustrating the procedure of save data record management.

FIG. 5 is a flowchart illustrating the procedure of save data record management. The application execution unit 130 starts an application (S10). At this time, the application calls an API processing module, allowing the virtual capacity acquisition unit 112 to acquire a size of virtual capacity of a save data area from the application (S12), and the storage capacity acquisition unit 114 acquires the total volume (data size) of the save data of the application recorded in the recording device 140 (S14).

The writing control unit 118 monitors a request for writing the save data from the application (N in S16). If there is the request for writing the save data (Y in S16), the free space acquisition unit 116 acquires a size of the free space of the recording device 140 (S18). The writing control unit 118 determines whether the total data size of the save data in the recording device 140 exceeds the size of the virtual capacity by recording the save data (S20). If the total data size exceeds the size of the virtual capacity (Y in S20), the writing control unit 118 determines that a writing error has occurred (S26). The writing control unit 118 returns to the application an error code indicating that saving cannot be carried out due to an insufficiency of virtual capacity. Since this is not an error occurred in the system, the application does not display an error message. The application may be configured such that the application displays a message indicating that the insufficient virtual capacity will be resolved by deleting the save data of the application when the application receives the error code. Alternatively, the application may display an announcement for deleting the save data. At this time, the application may display the amount of data and the number of save data items that are necessary for resolving the insufficient virtual capacity. This allows the user to know how many items of save data need to be deleted.

On the other hand, if the total data size of the save data does not exceed the size of the virtual capacity (N in S20), the writing control unit 118 determines whether the size of the free space of the recording device 140 is sufficient (S22). If the size of the free space is smaller than the size of the save data requested to be written (N in S22), the writing control unit 118 determines that a writing error has occurred (S26). The writing control unit 118 returns to the application an error code indicating that saving cannot be carried out due to an insufficiency of free space in the memory card 78. The application then displays an error message. The error message may be displayed by the display processing unit 120 in the system.

On the other hand, if the size of the free space is equal to or larger than the size of the save data requested to be written (Y in S22), the writing control unit 118 writes the save data in the recording device 140 (S24). As described above, record management processing of the save data is performed.

In the electronic device 10 according to the present exemplary embodiment, a mechanism can be provided where an application declares virtual capacity and where an API processing module manages the size of save data using the virtual capacity as upper limit so that the behavior of the application is not affected by the size of the free space of the recording device 140. The application only declares the virtual capacity and does not actually reserve a physical recording area. Thus, the application does not have an influence on the use of the recording device 140 by other applications.

In the example shown above, an explanation has been given regarding a case where a game program that has been installed in the game card 76 is later distributed through a game server. There is also a possibility that a game program distributed through a game server is later installed in the game card 76 and sold. Even in such a case, setting an upper limit value (virtual capacity) for a recording area that can be used by a game program ensures the operation of the game program on the game card 76.

In the present exemplary embodiment, save data is treated in units of slots. A slot ID is assigned to each slot. An API processing module formed by the display processing unit 120 displays information regarding save data on the display device 20 in units of slots. The amount of data for generating slots is also added to the size of the save data. Therefore, the value of the virtual capacity of the save data is actually a value obtained by subtracting the amount of data for generating slots from the declared virtual capacity.

The application can view slot information by calling the display processing unit 120. For example, a title and an update date and time of save data and the like are displayed as the slot information, and save data is mapped to each slot. When the user deletes a slot, corresponding save data is also deleted.

In the present exemplary embodiment, an application program is configured having at least functions shows as follows:
  a function of progressing an application;
  a function of calling an API processing module;
  a function of notifying the API processing module of a size of virtual capacity recorded in a configuration file;
  a function of generating save data;
  a function of notifying the API processing module a request for writing the save data;
  a function of receiving a first error code when the application attempts to write the save data whose size exceeds that of the virtual capacity in the recording device 140;
  a function of receiving a second error code when the application attempts to write the save data in the recording device 140 having insufficient free space;

a function of displaying an error message when the second error code is received; and a function of guiding the deletion of the save data when the first error code is received.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

What is claimed is:

1. An electronic device comprising:
    an execution unit configured to execute an application;
    a first acquisition unit configured to acquire from the application an upper limit value declared by the application, the value indicating a size of virtual capacity of a save data area, the size of virtual capacity being a maximum data amount of save data of the application that the application limits itself to the storage of;
    a second acquisition unit configured to acquire a size of save data of the application recorded in a recording device; and
    a writing control unit configured to prohibit the application from writing save data exceeding in the recording device the size of virtual capacity.

2. The electronic device according to claim 1, further comprising:
    a third acquisition unit configured to acquire a size of free space on the recording device,
    wherein the writing control unit prohibits the writing of save data whose size is larger than that of the free space.

3. The electronic device according to claim 1, further comprising:
    a third acquisition unit configured to acquire a size of free space on the recording device,
    wherein, upon the receipt of a request for writing save data whose size is larger than that of the free space, the writing control unit writes the save data in the recording device after data recorded in the recording device is deleted.

4. The electronic device according to claim 1, further comprising:
    a third acquisition unit configured to acquire a size of free space on the recording device,
    wherein, upon the receipt of a request for writing save data whose size is larger than that of the free space, the writing control unit saves the save data with an overwrite in the recording device.

5. A save data recording method comprising:
    acquiring from an application an upper limit value declared by the application, the value indicating a size of virtual capacity of a save data area, the size of virtual capacity being a maximum data amount of save data of the application that the application limits itself to the storage of;
    acquiring a size of save data of the application recorded in a recording device; and
    prohibiting the application from writing save data exceeding in the recording device the size of virtual capacity.

6. A non-transitory computer-readable recording medium containing a computer program embedded thereon, the computer program comprising:
    a module configured to acquire from an application an upper limit value declared by the application, the value indicating a size of virtual capacity of a save data area, the size of virtual capacity being a maximum data amount of save data of the application that the application limits itself to the storage of;
    a module configured to acquire a size of save data of the application recorded in a recording device; and
    a module configured to prohibit the application from writing save data exceeding in the recording device the size of virtual capacity.

7. A non-transitory computer-readable recording medium containing a computer program embedded thereon, the computer program comprising:
    a module configured to give notice of a size of virtual capacity recorded in a configuration file, the size of virtual capacity being a maximum data amount of save data of an application that the application limits itself to the storage of;
    a module configured to give notice of a request for writing save data; and
    a module configured to receive a predetermined error code when an application attempts to write the save data that exceeds in a recording device the size of virtual capacity.

* * * * *